United States Patent
Puente et al.

(10) Patent No.: US 11,755,627 B1
(45) Date of Patent: *Sep. 12, 2023

(54) SYSTEMS AND METHODS FOR CENTRALIZED DATABASE CLUSTER MANAGEMENT

(71) Applicant: United Services Automobile Association (USAA), San Antonio, TX (US)

(72) Inventors: Jose Puente, San Antonio, TX (US); Philip Hansen, San Antonio, TX (US); Jason Patrick Picarazzi, San Antonio, TX (US); Armondo Elias Ortega, San Antonio, TX (US); James Joseph Forrester, San Antonio, TX (US); Prasad Lakshmipathy, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/221,601

(22) Filed: Apr. 2, 2021

Related U.S. Application Data

(63) Continuation of application No. 15/955,573, filed on Apr. 17, 2018, now Pat. No. 10,997,216.

(60) Provisional application No. 62/486,865, filed on Apr. 18, 2017.

(51) Int. Cl.
*G06F 16/27* (2019.01)
*G06F 16/28* (2019.01)
*G06F 16/23* (2019.01)
*G06F 16/26* (2019.01)

(52) U.S. Cl.
CPC ........ *G06F 16/287* (2019.01); *G06F 16/2308* (2019.01); *G06F 16/26* (2019.01); *G06F 16/27* (2019.01)

(58) Field of Classification Search
CPC .... G06F 16/287; G06F 16/2308; G06F 16/26; G06F 16/27
See application file for complete search history.

(56) References Cited

U.S. PATENT DOCUMENTS 9,311,375 B1 * 4/2016 Naik ...................... G06F 16/275
9,778,946 B2 * 10/2017 Naik ...................... G06F 16/128
10,997,216 B1 5/2021 Puente et al.
(Continued)

*Primary Examiner* — Eliyah S. Harper
(74) *Attorney, Agent, or Firm* — Perkins Coie LLP

(57) ABSTRACT

Embodiments disclosed herein describe systems and methods to generate statuses of higher level integrated logical clusters from one or more output files generated by the clusterwares of a plurality of lower level physical clusters. The systems and methods provide an interactive dashboard graphical user interface (GUI) rendering the statuses of the higher level logical clusters. In response to a drill down selection by the system administrator, the systems and methods may render resource level statuses of the plurality of resources forming the higher level logical cluster. Therefore, by using a single dashboard, a system administrator can seamlessly transition between statuses at different level of abstractions for multiple resources distributed across multiple geographically diverse datacenters. Furthermore, the dashboard allows the system administrator to perform failover operations.

20 Claims, 10 Drawing Sheets

(56) References Cited

U.S. PATENT DOCUMENTS

| | | | |
|---|---|---|---|
| 11,088,916 B1* | 8/2021 | Chandrashekhar | ........................... H04L 41/0686 |
| 2002/0152293 A1* | 10/2002 | Hahn | ................... H04L 67/1001 709/239 |
| 2007/0168704 A1* | 7/2007 | Connolly | ............ G06F 11/2025 714/E11.073 |
| 2008/0162590 A1* | 7/2008 | Kundu | ................. G06F 16/2358 |
| 2009/0006888 A1* | 1/2009 | Bernhard | ................. G06F 11/08 714/6.12 |
| 2010/0241896 A1 | 9/2010 | Brown et al. | |
| 2013/0204948 A1* | 8/2013 | Zeyliger | ............. G06F 11/3055 709/221 |
| 2014/0149357 A1* | 5/2014 | Gupta | ................. G06F 11/1446 707/652 |
| 2015/0310026 A1* | 10/2015 | Chen | ........................ H04L 67/52 707/782 |
| 2016/0217042 A1* | 7/2016 | Wang | ................... G06F 11/1469 |
| 2017/0078380 A1 | 3/2017 | Aggarwal et al. | |
| 2020/0034471 A1* | 1/2020 | Danilov | ............. G06F 16/2246 |
| 2023/0121460 A1* | 4/2023 | Banerjee | ................. G06F 16/27 707/812 |

* cited by examiner

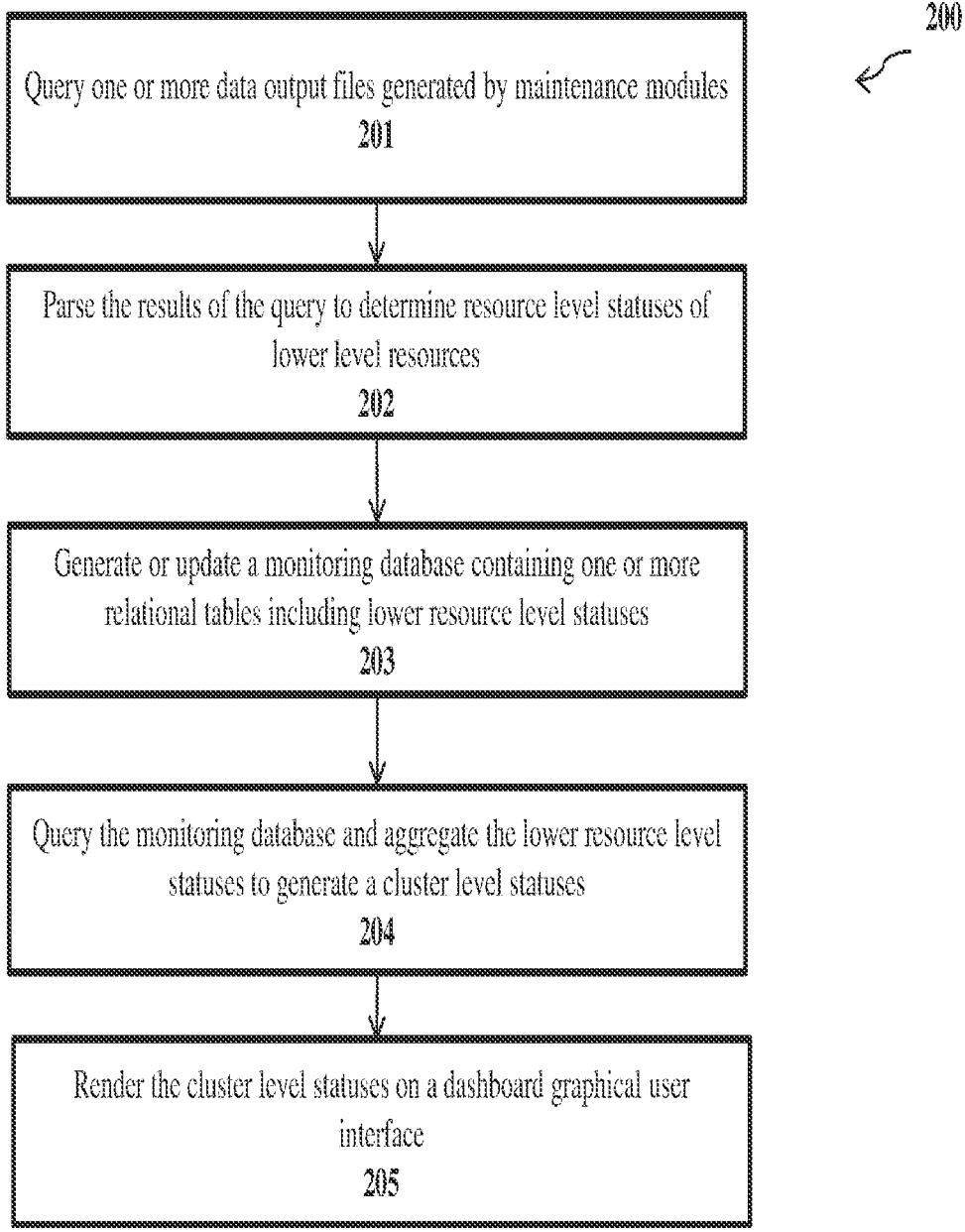

| CLUSTER NAME | DATACENTER_1 PRIMARY CLUSTER | DATACENTER_1 REPLICATION CLUSTER | DATACENTER_2 PRIMARY CLUSTER | DATACENTER_2 REPLICATION CLUSTER |
|---|---|---|---|---|
| CLUSTER_1 | ↑ 301a | ↑ 301b | ↑ 301c | ↑ 301d |
| CLUSTER_2 | ↑ 302a | ↓ 302b | ↑ 302c | ↑ 302d |
| CLUSTER_3 | ↓ 303a | ↑ 303b | ↑ 303c | ↑ 303d |
| CLUSTER_4 | ↑ 304a | ↑ 304b | ↑ 304c | ↓ 304d |

| Action Notification 407 | | | | | | |
|---|---|---|---|---|---|---|
| Action Type | Action Description | Status | Submitted On | Processing Time (Sec) | Process End Time | Submitted by |
| 408a | 408b | 408c | 408d | 408e | 408f | 408g |
| failover | failover DB_4 to primary cluster, primary server | In-Progress | \<mm/dd/yyyy\> \<hh:mm:ss\> | \<ss\> | \<mm/dd/yyyy\> \<hh:mm:ss\> | \<system admin\> |

| Action Notification | 407 | | | | | |
|---|---|---|---|---|---|---|
| Action Type<br>408a | Action Description<br>408b | Status<br>408c | Submitted On<br>408d | Processing Time<br>408e | Process End Time<br>408f | Submitted by<br>408g |
| failover | failover DB_4 to primary cluster, standby server | Completed | \<mm/dd/yyyy\> \<hh:mm:ss\> | \<ss\> | \<mm/dd/yyyy\> \<hh:mm:ss\> | \<system admin\> |

| DATABASE | DATACENTER_1 ||
|---|---|---|
| | Primary Cluster<br>[Primary Server] | Primary Cluster<br>[Standby Server] |
| DB_1 | 409a | 409b |
| DB_2 | 409c | 409d |
| DB_3 | 409e | 409f |
| DB_4 | 409g | 409h |

| Action Notification | 407 | | | | | |
|---|---|---|---|---|---|---|
| Action Type<br>408a | Action Description<br>408b | Status<br>408c | Submitted On<br>408d | Processing Time<br>408e | Process End Time<br>408f | Submitted by<br>408g |
| failover | failover DB_4 to primary cluster, primary server | Completed | <mm/dd/yyyy> <hh:mm:ss> | <ss> | <mm/dd/yyyy> <hh:mm:ss> | <system admin> |

| | DATACENTER_1 ||
|---|---|---|
| DATABASE | Primary Cluster [Primary Server] | Primary Cluster [Standby Server] |
| DB_1 | ↑ 409a | ↑ 409b |
| DB_2 | ↑ 409c | ↑ 409d |
| DB_3 | ↑ 409e | ↑ 409f |
| DB_4 | ↑ 409g | ↑ 409h |

SYSTEMS AND METHODS FOR CENTRALIZED DATABASE CLUSTER MANAGEMENT

CROSS-REFERENCE TO RELATED APPLICATION(S)

This application is a continuation of U.S. patent application No. 15/955,573, filed Apr. 17, 2018, which claims priority to U.S. Provisional Application No. 62/486,865, filed Apr. 18, 2017, which are incorporated herein by reference in their entireties.

TECHNICAL FIELD

This application relates generally to systems and methods for centrally managing geographically distributed datacenters, constituent database clusters, and the servers forming the database clusters.

BACKGROUND

A plurality of geographically distributed datacenters may be configured to contain the same database for redundancy and security, and to maintain a speedy database access for database queries and updates originating from different geographical locations. Each of the plurality of datacenters may be taking in different traffic at the same time. For example, a first datacenter may receive an update query to update a first piece of data and a second datacenter may receive an update query to update a second piece of data. When each of the respective datacenters executes the received queries, the databases within the datacenters are out of sync as to the first and second pieces of data. Each of the datacenters may receive millions of database queries throughout any given day and the database in all of the datacenters have to be synced to ensure the integrity of the data in all of the datacenters.

Each of the plurality of data centers may comprise multiple database clusters and each cluster may comprise multiple servers. Various operations are executed within the aforementioned servers and the clusters such that the databases across the geographically distributed datacenters remain in sync. To check the status of each of the servers, a system administrator has to login to the respective server and execute commands using a command line interface (CLI). In other words, the administrator has to check each server individually using the CLI. Furthermore, the outputs in response to a CLI command may include unnecessary and cryptic information that may be hard and time consuming to sift through. In other words, executing individual CLI commands for each of the servers may add a huge overhead for a system administrator or a user to check and discern the statuses of each of the servers and clusters and the overall status of a database in the plurality of geographically distributed datacenters.

SUMMARY

What is therefore needed is a centralized database cluster management system and method that provides an integrated dashboard that can be used by a system administrator/user to view and manage the overall status and the statuses of each of the servers and clusters of geographically distributed datacenters.

The systems and methods disclosed herein are intended to address the shortcomings in the art mentioned above, and provide additional or alternative benefits as well. More specifically, the systems and methods described herein may generate combined logical clusters aggregating multiple servers within geographically distributed datacenters. The systems and methods may generate a dashboard graphical user interface (GUI) that includes aggregated statuses of clusters formed by a set of servers and higher level clusters formed by sets of lower level clusters. Using the dashboard GUI, a user such as a system administrator may have a single view of the statuses of various clusters and servers of geographically distributed datacenters. Furthermore, the systems and methods may drill down from a status of a higher level cluster to render the corresponding individual statuses constituent clusters and servers in the dashboard GUI. Compared to the cumbersome conventional CLI based systems, the systems and methods described herein provide an integrated and interactive GUI based dashboard for a system administrator to maintain highly complex and geographically datacenters.

In an embodiment, computer implemented method comprises querying, by a computer, one or more data output files generated by a plurality of maintenance scripts executing on a plurality of servers within a plurality of geographically distributed datacenters; determining, by the computer, respective statuses of the plurality of servers based on the query of the one or more data files; generating, by the computer, one or more relational tables containing the respective statuses of the plurality of servers; storing, by the computer, the one or more relational tables into a monitoring database; receiving, by the computer, a request from a user to generate a dashboard graphical user interface (GUI) with a status of at least one logical cluster formed by a set of one or more physical clusters of at least one of the plurality of servers; querying, by the computer, the monitoring database to retrieve at least one relational table associated with the one or more physical clusters and the statuses of each of the one or more physical clusters; determining, by the computer, the status of the at least one logical cluster based upon the at least one relational table and the statuses of each of the one or more physical clusters; and displaying, by the computer, a dashboard GUI containing the status of the at least one logical cluster, wherein the dashboard GUI contains one or more indicators representing the statuses of each of the one or more physical clusters within the at least one logical cluster, and wherein the dashboard GUI is configured to receive a selection of a physical cluster in at the least one logical cluster and update the dashboard GUI to display statuses of one or more servers forming the selected physical cluster.

In another embodiment, a computer implemented system comprises a non-transitory storage medium configured to store a monitoring database; a processor connected to the non-transitory storage medium and configured to: query one or more data output files generated by a plurality of maintenance scripts executing on a plurality of servers within a plurality of geographically distributed datacenters; determine respective statuses of the plurality of servers based on the query of the one or more data files; generate one or more relational tables containing the respective statuses of the plurality of servers; store the one or more relational tables into the monitoring database; receive a request from a user to generate a dashboard graphical user interface (GUI) with a status of at least one logical cluster formed by a set of one or more physical clusters of at least one of the plurality of servers; query the monitoring database to retrieve at least one relational table associated with the one or more physical clusters and the statuses of each of the one or more physical clusters; determine the status of the at least one logical cluster based upon the at least one relational table and the statuses of each of the one or more physical clusters; and display a dashboard GUI containing the status of the at least one logical cluster, wherein the dashboard GUI contains one or more indicators representing the statuses of each of the one or more physical clusters within the at least one logical cluster, and wherein the dashboard GUI is configured to receive a selection of a physical cluster in at the least one logical cluster and update the dashboard GUI to display statuses of one or more servers forming the selected physical cluster.

In yet another embodiment, a computer readable non-transitory medium contains one or more computer instructions, which when executed by a processor cause the processor to query one or more data output files generated by a plurality of maintenance scripts executing on a plurality of servers within a plurality of geographically distributed datacenters; determine respective statuses of the plurality of servers based on the query of the one or more data files; generate one or more relational tables containing the respective statuses of the plurality of servers; store the one or more relational tables into a monitoring database; receive a request from a user to generate a dashboard graphical user interface (GUI) with a status of at least one logical cluster formed by a set of one or more physical clusters of at least one of the plurality of servers; query the monitoring database to retrieve at least one relational table associated with the one or more physical clusters and the statuses of each of the one or more physical clusters; determine the status of the at least one logical cluster based upon the at least one relational table and the statuses of each of the one or more physical clusters; and display a dashboard GUI containing the status of the at least one logical cluster, wherein the dashboard GUI contains one or more indicators representing the statuses of each of the one or more physical clusters within the at least one logical cluster, and wherein the dashboard GUI is configured to receive a selection of a physical cluster in at the least one logical cluster and update the dashboard GUI to display statuses of one or more servers forming the selected physical cluster.

BRIEF DESCRIPTION OF THE DRAWINGS

The accompanying drawings constitute a part of this specification and illustrate embodiments of the subject matter disclosed herein.

FIG. 2 shows a method for a centralized management of database clusters, according to an illustrative embodiment.

FIGS. 3A-3C show dashboard graphical user interfaces (GUIs), according to an illustrative embodiment.

FIGS. 4A-4E show dashboard graphical user interfaces (GUIs) for performing failover operations, according to an illustrative embodiment.

DETAILED DESCRIPTION

Figure 1:
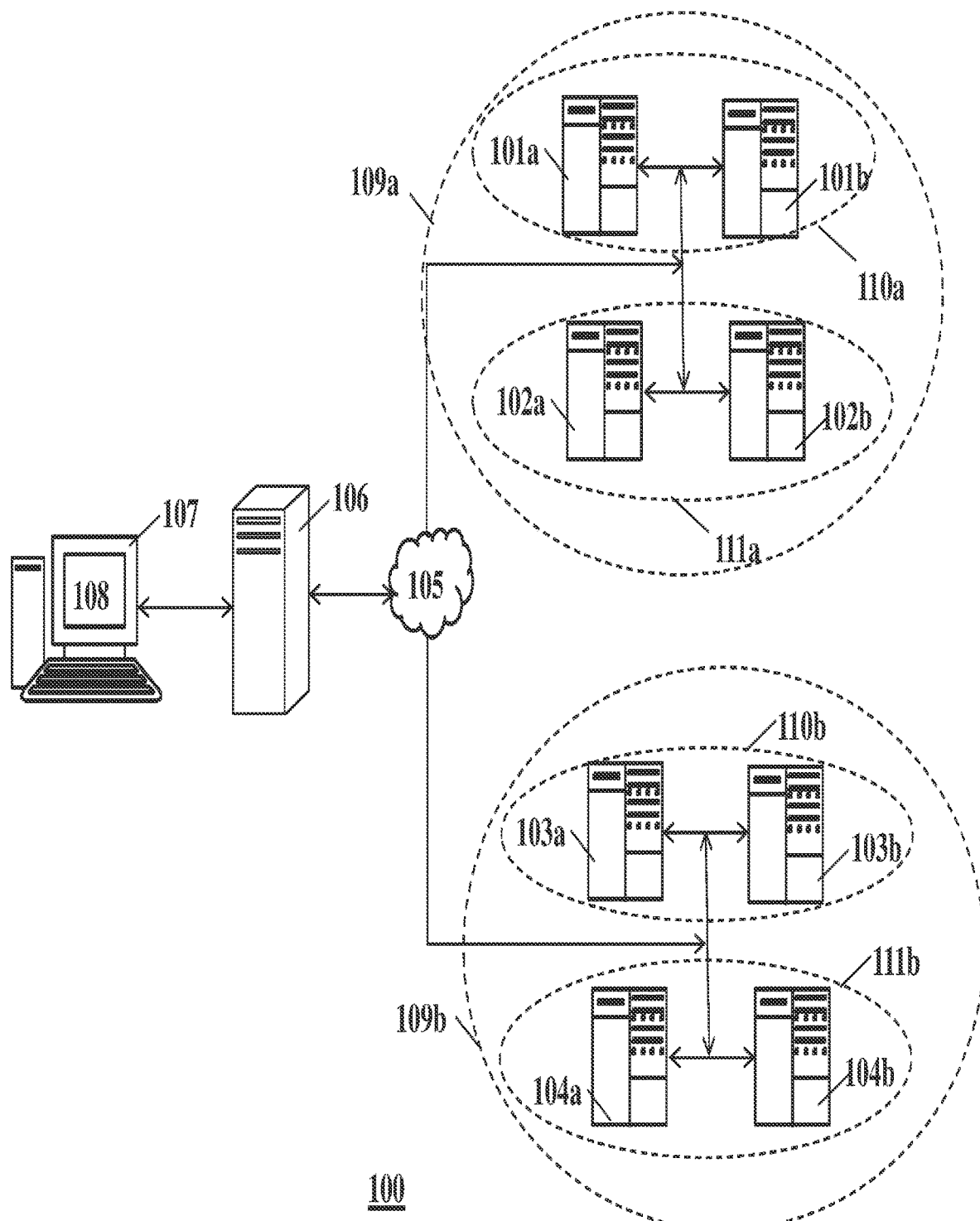
FIG. 1 shows an illustrative system for a centralized management of database clusters, according to an illustrative embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The complexity of managing geographically distributed datacenters or server farms has increased exponentially. Multiple redundancies and multiple failover scenarios are built into the databases such that the databases are always online to handle the incoming traffic. Therefore, multiple copies of a single database may be stored at multiple servers throughout geographically distributed datacenters. Furthermore, copies of the databases may be stored at servers of different datacenters to cater to the users who are closer to the datacenters. To ensure that the databases remain synchronized, a system administrator has to track the statuses of multiple servers across geographically distributed datacenters. The conventional command line interface (CLI) is cumbersome and inefficient with a large overhead as described above.

A datacenter may comprise a primary cluster and a replication cluster, with the primary cluster containing the database and the replication cluster containing the components needed to read and replicate traffic from the database on the primary cluster, and therefore both clusters may be referred as having the same database. One having ordinary skill in the art appreciates that the primary cluster and the replication cluster may contain the set of same databases. However, for brevity, the description below describes the primary cluster and the replication cluster having a single and identical database. The primary cluster may receive the incoming traffic such as queries and updates and accordingly provide information based on the queries and update the database based on the updates. The replication cluster contains a copy of the database of the primary cluster and may be in sync with the primary cluster such that any update at the primary cluster is propagated to the replication cluster as well. Replication clusters may be used to synchronize databases in two or more datacenters. For example, a first datacenter and a second datacenter may contain the same database while each of the datacenters may be taking in different traffic at the same time. A first replication cluster in the first datacenter may be used to synchronize a second primary cluster in the second datacenter with a first primary cluster in the first datacenter. Similarly, a second replication cluster in the second datacenter may be used to synchronize the first primary cluster with the second primary cluster.

Each of the clusters, be it a primary cluster or a replication cluster, may include a primary server and a standby server. A primary server may contain the same database as a corresponding standby server. The primary server may receive the query and update traffic to the cluster and the standby server may serve as a backup, for example, by being the primary server during a switchover or a failover. In some implementations, the primary server may act as a master and the standby server may act as a slave, and when the master server fails the standby server may act as a master.

One having ordinary skill in the art appreciates that a cluster may be abstracted at various levels. For example, a lower level physical cluster may have one primary server and one standby server. However, a higher level cluster may contain multiple clusters within a single datacenter or distributed throughout multiple datacenters. At the very top, the systems and methods may generate a single logical cluster containing all the resources, that is all the servers and clusters, of all the datacenters being monitored and managed. As opposed to conventional systems of a discrete server level CLI outputs, the present disclosure allows a system administrator to monitor and manage multiple datacenters at various levels of abstraction. For example, the systems and methods may provide an aggregated status of a large cluster, an aggregated status of a small cluster, a status of a single server, or a status of a single resource (e.g., a network card) within a server. A system administrator may seamlessly drill down to granular lower level components from a higher level status or drill up from the granular lower level components to the statuses at a higher level of abstraction.

Embodiments disclosed herein describe systems and methods to generate a dashboard graphical user interface (GUI) for a user to view all of the clusters in one or more datacenters as a single logical cluster. For example, for two datacenters each having a primary cluster and a replication cluster, wherein each of the clusters has a primary server and a standby server, systems and methods disclosed herein may generate and render a single view in the interface for the user showing the operating statuses of each of the datacenters, the clusters, and/or the datacenters. The user may utilize the dashboard GUI for various types of views, such as a snapshot view of multiple datacenters or a drilled down view of a single server or a single component within the single server.

Embodiments disclosed herein may be used for various types of databases, including, but not limited to IBM Db2, structured query language (SQL) database, and/or Oracle database. The specific examples below of database functionality are merely for the ease of explanation without intending to limit the scope of this disclosure.

FIG. 1 shows components of an exemplary system 100, according to an exemplary embodiment. The system 100 may comprise one or more datacenters 109, a communication medium 105, an admin server 106, and an admin device 107. One having ordinary skill in the art understands that the shown components are merely exemplary, and one or more components may be substituted or omitted to achieve the functionality described herein.

The datacenters 109 may comprise one or more clusters. For example, a first datacenter 109*a* may comprise a first primary cluster 110*a* and a first replication cluster 111*a*, and a second datacenter 109*b* may comprise a second primary cluster 110*b* and a second replication cluster 111*b*. Each of the datacenters 109 may further include telecommunications components, redundant data communications connections, primary power supply and redundant/backup power supplies, environmental control components, security components, and/or other types of components known to one having ordinary skill in the art. In some embodiments, the datacenters 109 may be geographically separated. For example, the first datacenter 109*a* and the second datacenter 109*b* may be located at two different cities in the same country. Alternatively, the first datacenter 109*a* may be located in a first country and the second datacenter 109*b* may be located in a second country. Each of the primary clusters 110 and each of the replication clusters 111 may comprise one or more servers. For example, the first primary cluster 110*a* may comprise a first server 101*a* and a second server 101*b*; the first replication cluster 111*a* may comprise a third server 102*a* and a fourth server 102*b*; the second primary cluster 110*b* may comprise a fifth server 103*a* and a sixth server 103*b*; and the second replication cluster 111*b* may comprise a seventh server 104*a* and an eighth server 104*b*.

Among the pair of servers within a cluster, a first server may operate as a primary server and a second server may operate as a standby server. For example, in the first cluster 110*a*, the first server 101*a* may operate as a primary server and the second server 101*b* may operate as a standby server. One having ordinary skill in the art appreciates that during a switchover or a failover, the standby server 101*b* may operate as a primary server until the primary server 101*a* comes back to an online mode. The physical clusters 110, 111 may be referred to as a single logical cluster. One or more servers 101, 102, 103, 104 or clusters 110, 111 may also be referred to as nodes throughout this disclosure.

A cluster manager may be a software running on a lower level cluster, for example cluster 110*a* containing the primary server 101*a* and the standby server 101*b*, to allocate the resources in the cluster based on the incoming traffic. For example, if the primary server 101*a* in the cluster 110*a* is down, the cluster manager may direct the incoming traffic to the standby server 101*b*. The cluster manager may automatically execute one or more operations to synchronize the databases in the primary server 101*a* and the standby server 101*b* after failovers or switchovers. The cluster manager may include maintenance modules that may execute periodically to generate the statuses of the primary server 101*a* and the standby server 101*b* and generate one or more data output files containing the aforementioned statuses.

In some embodiments, each of the datacenters 109 contain the same database (or identical sets of multiple databases). However, each of the datacenters may take different web traffic at the same time. For example, a first user may be geographically closer to the first datacenter 109*a* and a second user may be geographically closer to the second datacenter 109*b*. The first datacenter 109*a* may take any search query or data update from the first user and the second datacenter 109*b* may take search query or data update from the second user. In some instances, the first user may move a first location geographically closer to the first datacenter 109*a* to a second location geographically closer to the second datacenter 109*b*. In this situation, the first datacenter 109*a* may take a search query or data update from the first user when the first user is at the first location and the second datacenter 109*b* may take a search query or a data update from the first user when the first user is at the second location. In some embodiments, when one of the two datacenters 109*a* fails or goes offline, the remaining datacenter 109*b* may take all the incoming traffic regardless of the location of the one or more users generating the incoming traffic.

Because the datacenters 109 are taking different incoming traffic at the same time, each of the datacenters 109 may apply different updates to the respective database. To synchronize the databases such that each of the datacenters 109 contains a copy of the same database, each of the datacenters 109 may contain a replication cluster 111. Each replication cluster 111 may maintain a copy of the database contained in the corresponding primary cluster 110. For example, in the embodiment described herein, the first replication cluster 111*a* may have a copy of the database in the first primary cluster 110*a*. The first primary cluster 110*a* may propagate any update to the database to the first replication cluster 111*a* such that the replication cluster may maintain the same copy of the database. The replication cluster 111*a* may further transmit the updates to the datacenter 109*b* such that the update in the database at the first primary cluster 110*a* is propagated to the datacenter 109*b*. Similarly, the second replication cluster 111*b* may receive updates from the second primary cluster 110*b*, may update its database, and propagate the update to the first datacenter 109a. In other words, each of the replication clusters 111 may execute update operations such that the database (or multiple databases) in both the datacenters 109 stays synchronized with each other. One having ordinary skill in the art appreciates that the sequence of operations described above is merely exemplary and other sequences of operations to keep the databases in the datacenters 109 synchronized are within the scope of the present disclosure.

The communication medium 105 may be any type of communication medium such as a local area network (LAN), metropolitan area network (MAN), and/or a wide area network (WAN). For instance, the communication medium 105 may be the Internet. The communication medium 105 may be a combination of various wired and wireless links capable of carrying data packets in between the datacenters 109, the admin server 106, and admin device 107.

The admin server 106 may be any kind of computing device running one or more software modules allowing a system administrator or an admin user to view and control one or more statuses of the datacenters 109, the clusters 110, 111, and/or the servers 101, 102, 103, 104. The admin user may access the admin server 106 using the admin device 107, which may be any type of computing device having a user interface 108. Exemplary admin devices 107 may include a desktop computer, a laptop computer, a tablet computer, and a smartphone. In some embodiments, a single computing device may function as both the admin server 106 and the admin device 107. In some embodiments, the user interface 108 may be a graphical user interface (GUI) rendering the statuses of the datacenters 109, the clusters 110, 111 and/or the servers 101, 102, 103, 104 and providing one or more interactive tools for the system admin to control the datacenters 109, the clusters 110, 111, and/or the servers 101, 102, 103, 104. For example, the GUI may render an integrated dashboard with one or more view panels and one or more control panels. The integrated dashboard may render graphic representations of the datacenters 109, the clusters 110, 111, and/or the servers 101, 102, 103, 104, graphic representations of the statuses of these components alongside graphical representations of admin customizable options. One having ordinary skill in the art understands that the admin server 106 and the admin device 107 may form an admin computer system and further may be a single device. Furthermore, one having ordinary skill in the art understands that the admin server 106 or portions thereof may reside on one or more of the clusters 110, 111.

In operation, the admin server 106 may query a plurality of data output files generated by the respective clusterwares running on the clusters 110a, 110b, 111a, 111b. Based on the query, the admin server 106 may determine the server level statuses of the servers 101, 102, 103, 104 and the resource level statues of the resources within the server 101, 102, 103, 104. For example, the admin server 106 may parse the plurality of the output files to determine the server level statuses and the resource level statuses. Based on the query and/or parsing, the admin server may generate or update a monitoring database including one or more relational tables storing the server level statuses or the resource level statuses. Upon receiving a user request to generate or update a dashboard GUI, the admin server 106 may query the resource database and generate the statuses of the resources at a higher level abstraction. For example, the admin server may generate a combined status of the primary cluster 110a and the replication cluster 111a and render the status in the dashboard GUI. Furthermore, upon receiving a request to drill down, the admin server may query the resource database to determine the statuses of the servers 101a, 101b in the primary cluster 110a and the servers 102a, 102b in the replication cluster and render the statuses in the dashboard GUI. In response to a request to further drill down, the admin computer system may determine the statuses of discrete resources in the servers 101a, 101b, 102a, 102b and render the statuses in the dashboard GUI. Upon receiving a drill up request, the admin server 106 may query the monitoring database to determine an aggregate status of the resources at a higher level of abstraction, for example, the admin server 106 may query the monitoring database to generate the status of the primary cluster 110a and render the status in the dashboard GUI. In this fashion, a system administrator may seamlessly drill up and drill down to monitor the statuses of various resources within the datacenters 109a, 109b using a single integrated dashboard GUI.

FIG. 2 shows an exemplary method 200 for centrally managing multiple database clusters, according to an exemplary embodiment. Although one or more computing devices and one or more databases may implement one or more steps of the method 200, the following description details, for brevity, an admin computer system implementing the steps of the method 200. One having skill in the art will appreciate that some embodiments may comprise additional or alternative steps, or may omit several steps altogether.

In a first step 201, the admin computer system may query one or more data output files generated by maintenance modules running on lower level clusters. A lower level cluster may be a physical cluster consisting of a primary server and a standby server. For example, a first maintenance module (e.g., a cron job) executing one first cluster may generate a first data output file based upon the command line interface (CLI) commands in the first maintenance module. The first output file may include a data dump generated in response to the CLI commands. The data dump may include statuses of the discrete components within the lower level cluster, such as the status of one or more network interfaces and one or more storage devices.

In a next step 202, the admin computer system may parse the one or more output files to determine resource level statuses. For example, the admin computer system may parse a first output file containing a data dump generated by a regularly scheduled cron job in a lower level physical cluster. Based on the parsing, the admin computer system may determine the statuses of the various resources within the lower level physical cluster. In some implementations, the admin computer system may parse the output files to generate comma-separated delimited files. The admin computer system may import these comma-separated delimited files into a monitoring database.

In a next step 203, the admin computer system may generate or update a monitoring database containing one or more relational tables including the lower resource level statuses. In the embodiments where the admin computer system generates a monitoring database, the admin computer system may, for example, import multiple comma-separated delimited files containing the statuses of the lower level resources. Based on these files, the admin computer system may generate one or more relational tables containing the statuses of the lower level resources and store these relational tables into a monitoring database. In the embodiments where the admin computer system updates a monitoring database, the admin computer system may, for example, import multiple comma- separated delimited files containing the statuses of the lower level resources. Based on these files, the admin computer system may update one or more relational tables containing the statuses of the lower level resources and store the updated relational tables into the monitoring database. The admin computer system may use the monitoring database to respond to various selections made by a system administrator in a dashboard graphical user interface (GUI).

In a next step 204, the admin computer system may query the monitoring database and aggregate the lower level statuses to generate integrated cluster level statuses. The admin computer system may query the monitoring database in response to one or more selections/requests made by a system administrator on the dashboard GUI. For example, a system administrator may press a refresh button, or select a link to drill down or drill up. For example, the system administrator may select an interactive tool to look up the status of a higher level logical cluster. In response to this selection, the admin computer system may query the monitoring database to determine the statuses of each of the components within the higher level logical cluster. Based on the statuses of components and the relationship between the components, the admin computer system may determine a cluster level status of the logical cluster.

In a next step 205, the admin computer system may render the cluster level statuses on the dashboard GUI. In some implementations, admin computer system may render the statuses graphically, such as using different symbols for different statuses as detailed below. In addition or in the alternative, the admin computer system may render the statuses on a tabular form, also as detailed below.

Figure 3B:
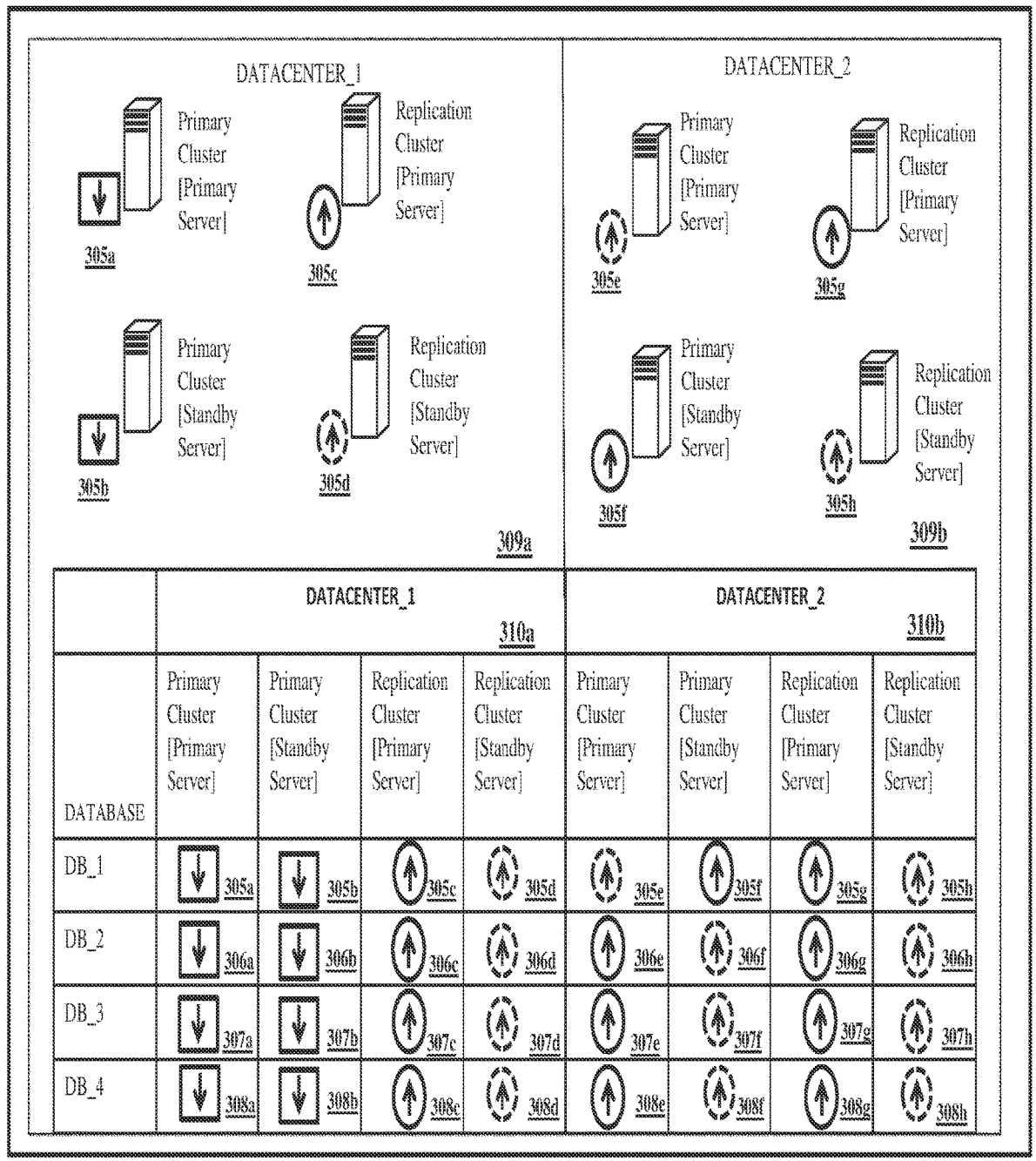
Figure 3C:
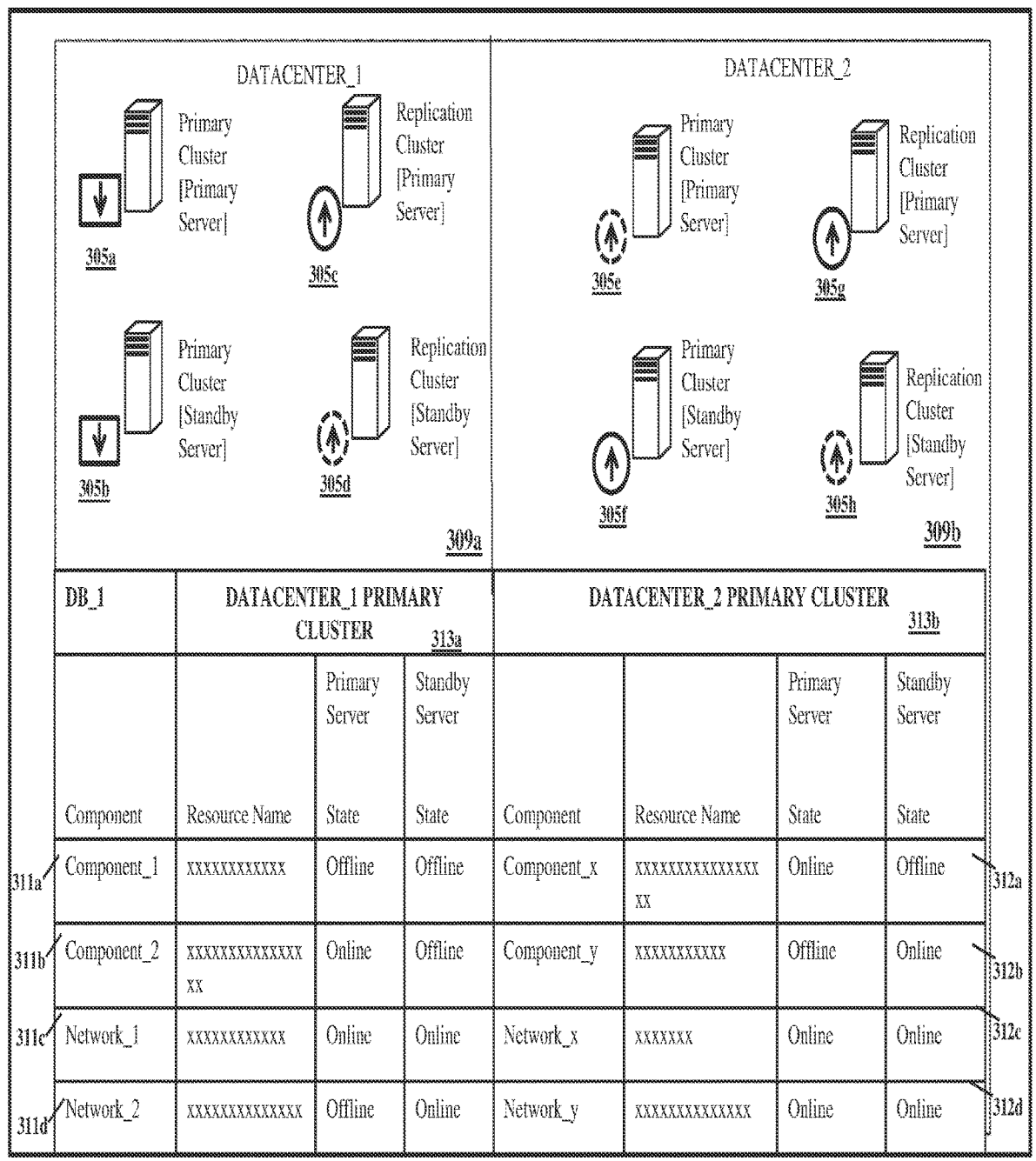

FIGS. 3A-3C show a dashboard graphical user interface (GUI) generated by an admin computer system. In some implementations, the computer system may generate the GUI by one or more queries to the data output files containing data dumps generated by regularly scheduled maintenance scripts (e.g., cron jobs) on one or more servers forming a physical cluster. For example, one or more servers may execute cron jobs every five minutes executing a set of command line interface (CLI) commands and generate data dumps. The admin computer system may execute a first set of queries to generate or update a monitoring database. For example, the admin computer system may execute the first set of queries and may store the generated data into a monitoring database. The admin computer system may execute a second set of queries to generate the GUI.

In some implementations, the admin computer system may execute the first set of queries to the data output files generated by scheduled maintenance modules, containing the scheduled maintenance scripts, in regular intervals. For example, the admin computer system may execute the first set of queries to the data output files every five minutes or every ten minutes. The admin computer system may synchronize the timing of the first set of queries with the updates to the data output files. For example, the maintenance modules generate or update the data output files every five minutes, the admin computer system may execute the first set of queries every five minutes an interval of time later than the generating or the updating the data output files from the maintenance modules. In other implementations, the admin computer system may receive an indication that the maintenance modules have generated or updated the data output files and execute the first set of queries in response to receiving such indication. The admin computer system may generate or update the monitoring database based upon the result of the first set of queries executed on the data output files. The monitoring database may include one or more relational tables indicating the statuses of one or more resources within one or more datacenters. For example, a relational table may indicate that a primary server in a cluster within a first datacenter is offline due to a failover or a switchover. The admin computer system may execute a second set of queries in the monitoring database to generate the GUI. Continuing with the above example, the admin computer system may determine that the primary server of the cluster is offline due to a failover and render a corresponding indication on the GUI. The admin computer system may further aggregate one or more resource level statuses to generate a cluster level status. In general, the admin computer system may aggregate statuses of constituent lower level resources to generate an aggregated status of a higher level resource formed by the lower level resources. Continuing with the above example, if the primary server is down and the standby server is up, the admin computer system may determine that the database cluster is in a switchover state and render the same in the GUI.

FIG. 3A shows an exemplary dashboard GUI 300 with the statuses of four clusters cluster_1, cluster_2, cluster_3, and cluster_4. Each of these clusters may comprise constituent clusters distributed among a plurality of datacenters. For example, cluster_1 may comprise a primary cluster and a replication cluster in datacenter_1 and a primary cluster and a replication cluster in datacenter_2. The primary and replication clusters for both of datacenter_1 and datacenter_2 are grouped into cluster_1 based on the database hosted by the primary and the replication clusters. For example, primary clusters and replication clusters hosting the same set of one or more databases may be grouped into cluster_1.

As shown in FIG. 3A, the dashboard GUI 300 may render statuses 301, 302, 303, 304 for each of the constituent clusters in cluster_1, cluster_2, cluster_3, and cluster_4. The admin computer system may select a status for the constituent cluster from a set of statuses comprising healthy, under switchover, primary server down, and under maintenance. As shown in the dashboard GUI 300, for cluster_1, the admin computer system may render statuses 301 of the constituent clusters as follows: datacenter_1, primary cluster-status 301*a* under maintenance; datacenter_1, replication cluster-status 301*b* healthy; datacenter_2, primary cluster-status 301*c* healthy; and datacenter_2, replication cluster-status 301*d* healthy. For cluster_2, the admin computer system may render the statuses 302 of the constituent clusters as follows: datacenter_1, primary cluster- status 302*a* under switchover; datacenter_1, replication cluster-status 302*b* primary server down; datacenter_2, primary cluster-status 302*c* healthy; and datacenter_2, replication cluster-status 302*d* healthy. For cluster_3, the admin computer system may render the statuses 303 of the constituent clusters as follows: datacenter_1, primary cluster-status 303*a* primary server down; datacenter_1, replication cluster-status 303*b* healthy; datacenter_2, primary cluster-status 303*c* under switchover; and datacenter_2, replication cluster-status 303*d* healthy. For cluster_4, the admin computer system may render the statuses 304 of the constituent clusters as follows: datacenter_1, primary cluster-status 304*a* healthy; datacenter_1, replication cluster-status 304*b* healthy; datacenter_2, primary cluster-status 304*c* healthy; and datacenter_2, replication cluster-status 304*d* primary server down. In other words, the admin computer system may generate aggregate statuses 301, 302, 303, 304 of the constituent clusters based upon the statuses of the individual servers forming the constituent clusters.

The admin computer system may allow a system administrator to drill down into individual server level statuses, for each of the databases hosted by the servers. The admin computer system may receive a selection of a cluster by the system administrator and render the statuses of the individual servers in the cluster in the dashboard GUI. For example, FIG. 3B shows an exemplary updated dashboard GUI 300*b* with the statuses 305, 306, 307, 308 of the individual servers in a cluster. The admin computer system may generate the updated dashboard GUI 300*b* based upon the system administrator selecting an individual cluster, for example cluster_3. For cluster_3, the updated dashboard GUI 300*b* may show the statuses 305, 306, 307, 308 of individual servers distributed between datacenter_1 and datacenter_2. Within the GUI 300*b*, the admin computer may display graphical views 309 and tabular views 310 of the statuses 305, 306, 307, 308 of the servers of cluster_3. The graphical views 309 may be based upon the system administrator's selection in the tabular views 310, as described below.

In the tabular views 310, the admin computer may display the statuses 305, 306, 307, 308 of the servers within cluster_3, which may be hosting databases DB_1, DB_2, DB_3, and DB_4. As displayed in the tabular views 310, the statuses 305 of servers hosting DB_1 may include datacenter_1, primary cluster, primary server-status 305*a* primary server down; datacenter_1, primary cluster, standby server-status 305*b* primary server down; datacenter_1, replication cluster, primary server-status 305*c* healthy; datacenter_1, replication cluster, standby server-status 305*d* under switchover; datacenter_2, primary cluster, primary server-status 305*e* under switchover; datacenter_2, primary cluster, standby server-status 305*f* healthy; datacenter_2, replication cluster, primary server-status 305*g* healthy; and datacenter_2, replication cluster, standby server-status 305*h* under switchover.

The statuses 306 of servers hosting DB_2 may include datacenter_1, primary cluster, primary server-status 306*a* primary server down; datacenter_1, primary cluster, standby server-status 306*b* primary server down; datacenter_1, replication cluster, primary server-status 306*c* healthy; datacenter_1, replication cluster, standby server-status 306*d* under switchover; datacenter_2, primary cluster, primary server-status 306*e* healthy; datacenter_2, primary cluster, standby server-status 306*f* under switchover; datacenter_2, replication cluster, primary server-status 306*g* healthy; and datacenter_2, replication cluster, standby server-status 306*h* under switchover.

The statuses 307 of servers hosting DB_3 may include datacenter_1, primary cluster, primary server-status 307*a* primary server down; datacenter_1, primary cluster, standby server-status 307*b* primary server down; datacenter_1, replication cluster, primary server-status 307*c* healthy; datacenter_1, replication cluster, standby server-status 307*d* under switchover; datacenter_2, primary cluster, primary server-status 307*e* healthy; datacenter_2, primary cluster, standby server-status 307*f* under switchover; datacenter_2, replication cluster, primary server-status 307*g* healthy; and datacenter_2, replication cluster, standby server-status 307*h* under switchover.

The statuses 308 of servers hosting DB_4 may include datacenter_1, primary cluster, primary server-status 308*a* primary server down; datacenter_1, primary cluster, standby server-status 308*b* primary server down; datacenter_1, replication cluster, primary server-status 308*c* healthy; datacenter_1, replication cluster, standby server-status 308*d* under switchover; datacenter_2, primary cluster, primary server-status 308*e* healthy; datacenter_2, primary cluster, standby server-status 308*f* under switchover; datacenter_2, replication cluster, primary server-status 308*g* healthy; and datacenter_2, replication cluster, standby server-status 308*h* under switchover.

The admin computer may graphically display the statuses of servers in the graphical views 309 of a database selected in the tabular views 310. As shown in the GUI 300*b*, system administrator may have selected DB_1 in the tabular views 310 and the admin computer may display the statuses 305 of servers hosting DB_1. As displayed in the graphical view 310*a*, the statuses 305 of servers hosting DB_1 in datacenter_1 may include primary cluster, primary server-status 305*a* primary server down; primary cluster, standby server-status 305*b* primary server down; replication cluster, primary server-status 305*c* healthy; replication cluster, standby server-status 305*d* under switchover. Similarly, as displayed in the graphical view 310*b*, the statuses of the 305 of the servers hosting DB_1 in datacenter_2 may include primary cluster, primary server-status 305*e* under switchover; primary cluster, standby server-status 305*f* healthy; replication cluster, primary server- status 305*g* healthy; and replication cluster, standby server-status 305*h* under switchover.

The admin computer system may further allow the system administrator to view a resource level status for each of the databases being hosted by each of the clusters. The system administrator may select a database, DB_1 for example, to view the resource level status for DB_1. In response to the system administrator selecting DB_1, the admin computer system may generate a dashboard GUI 300*c* as shown in FIG. 3C. The dashboard GUI 300*c* may render component level statuses of various components within one or more primary servers and standby servers hosting the database. As shown, the dashboard GUI 300*c* may include tabular views 313 of the component level statuses. In the tabular view 313*a* of the primary cluster of datacenter_1, status 311*a* of component_1 may be primary server: offline, standby server: offline; status 311*b* of component_2 may be primary server: online, standby server; offline; status 311*c* of network_1 may be primary server: online, standby server: online; and status 311*d* of network_2 may be primary server: offline, standby server: online. Furthermore, in the tabular view 313*b* of the primary cluster of datacenter_2, status 312*a* of component_x may be primary server: online, standby server: offline; status 312*b* of component_y may be primary server: offline, standby server; online; status 312*c* of network_x may be primary server: online, standby server: online; and status 312*d* of network_2 may be primary server: online, standby server: online.

One having ordinary skill in the art appreciates that the aforementioned statuses determined and rendered in the dashboard GUI by the admin computer system are merely exemplary. Other types of GUIs rendering similar statuses are contemplated to be within the scope of this disclosure. Other types of GUIs may include different types of graphics and texts that will allow a system administrator to visualize the status of the various clusters and servers distributed within geographically dispersed datacenters.

Figure 4A:
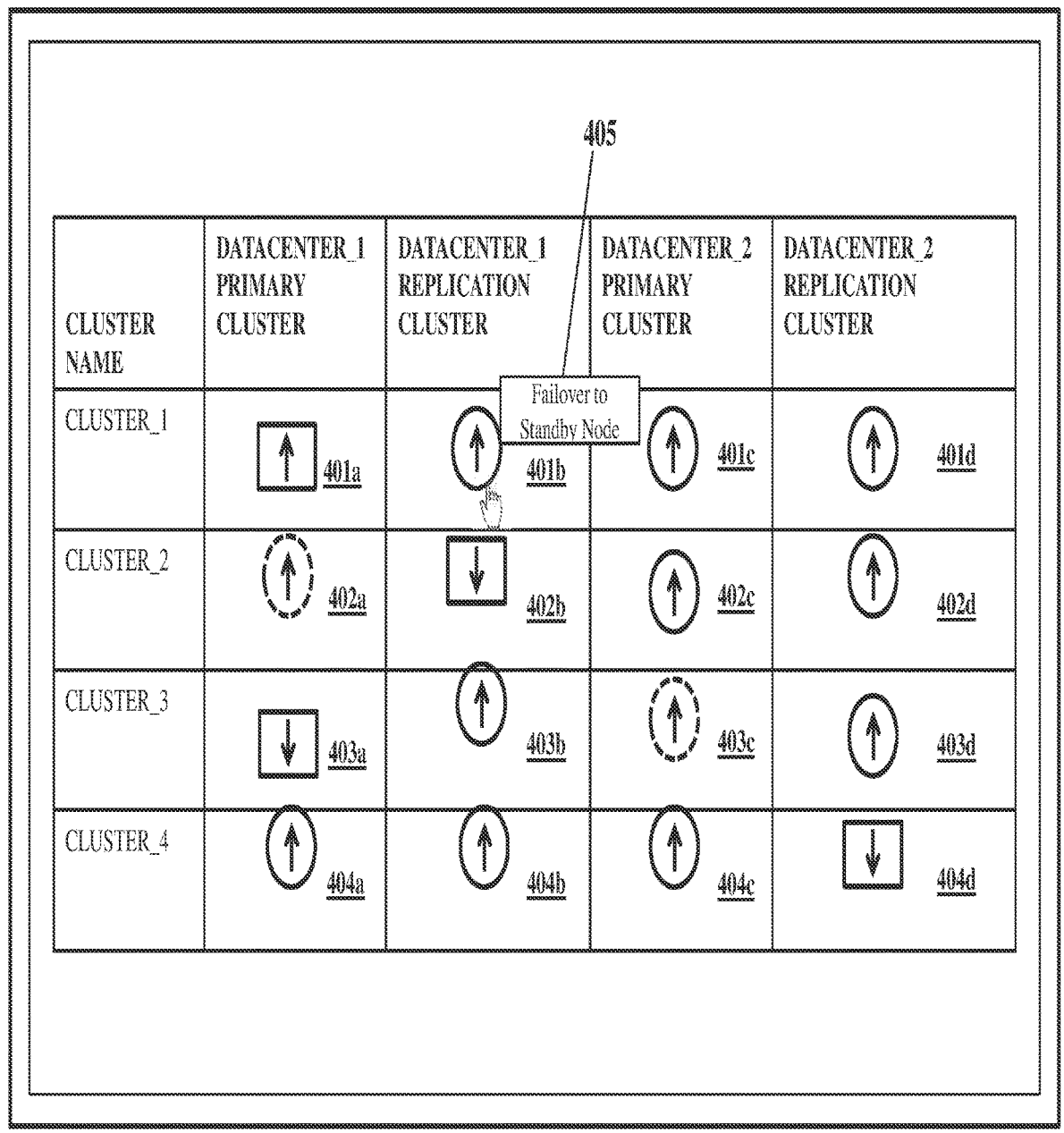
Figure 4B:
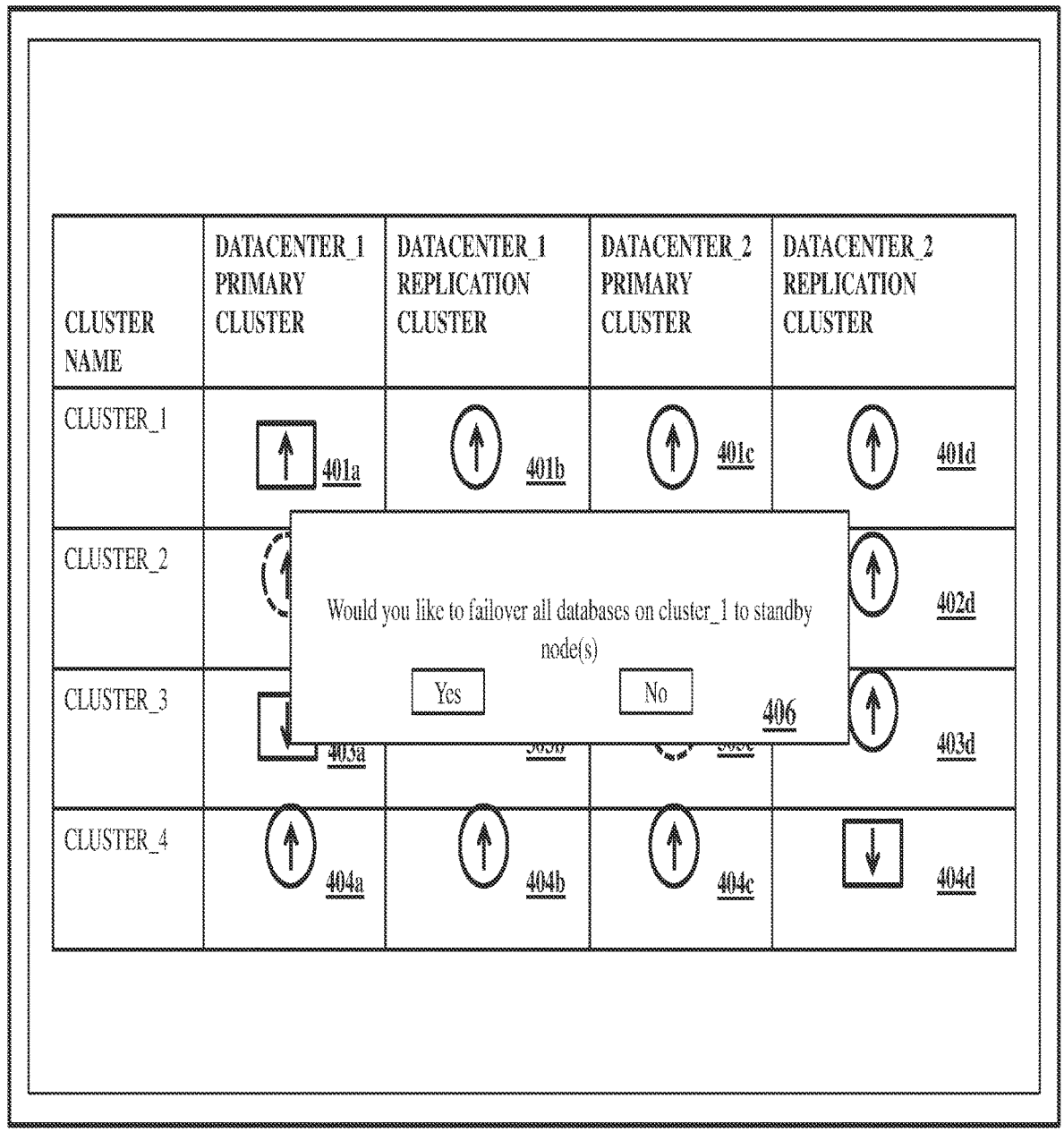

The admin computer may display the illustrative GUIs described above to be interactive to allow the system administrator to perform one or more operations. For instance, the admin computer may allow the system administrator to perform a failover operation. FIG. 4A shows an illustrative GUI 400*a* displayed by the admin computer showing the statuses 401, 402, 403, 404 of cluster_1, cluster_2, cluster_3 and cluster_4. When the system administrator interacts with one or more statuses 401, 402, 403, 404 of the clusters, the admin computer may display an option for a failover. In the GUI 400*a*, the system administrator may have interacted with the status 401*b* of cluster_1. The interaction may include, for example, hovering of a mouse pointer over the icon indicating the status 401*b*. In response, the admin computer may display an option of failover to the standby node of the cluster selected. In other words, the system administrator may failover the databases of cluster_1 (primary cluster) to the standby node(s) in cluster_1 (primary cluster). The admin computer may also display, as shown in FIG. 4B, a GUI 400*b* including a confirmation dialog box 406 for the system administrator to provide the confirmation for the failover. It should be understood that the confirmation dialog box 406 is merely illustrative and the admin computer may display other forms and/or levels of confirmation dialog boxes.

The admin computer may further display action notifications for in-progress and completed failovers. An illustrative GUI 400*c* showing an illustrative action notification dialog box 407 is shown in FIG. 4C. As shown, action notification dialog box 407 may include fields such as action type 408*a* indicating the type of action such as failover; action description 408*b* indicating clusters and/or databases affected by the action; status 408*c* of the action, which may be in progress or completed; submitted on 408*d* indicating the date and time of the action request; processing time 408*e* indicating time elapsed since submission of the action request or time taken to complete the action; process end time 408*f* indicating the time the action ended; and submitted by 408*g* indicating the identification of the user submitting the action request, usually the system administrator.

FIG. 4D shows an illustrative GUI 400*d* displaying a completed action notification dialog box 407 for a failover and the statuses 409 of databases after the completion of the failover. The failover request, as indicated in the action description field 408*b* of the action notification dialog box 407 may be to failover DB_4 to the primary cluster, standby server in datacenter_1. After the failover, the GUI 400*d* may display an active status 409*h* for the primary cluster, standby server. FIG. 4E shows an illustrative GUI 400*e* displaying a completed action notification dialog box 407 for a failover and the statuses 409 of databases after the completion of the failover. The failover request, as indicated in the action description field 408*b* of the action notification dialog box 407 may be to failover DB_4 to the primary cluster, primary server in datacenter_1. After the failover, the GUI 400*e* may display an active status 409*g* for the primary cluster, standby server.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

We claim:

1. A computer implemented method comprising:
   generating, by a computing system, a dashboard graphical user interface (GUI) with a status of at least one logical cluster formed by a set of physical clusters of at least one of a plurality of servers;
   querying, by the computing system, a database to retrieve at least one relational table associated with the set of physical clusters and the statuses of each of the set of physical clusters;
   determining, by the computing system, the status of the at least one logical cluster based upon the at least one relational table and the statuses of each of the set of physical clusters;
   displaying, by the computing system, a dashboard GUI containing the status of the at least one logical cluster and a cluster hierarchy formed by one or more indicators simultaneously representing the statuses of each of the set of physical clusters within the at least one logical cluster,
      wherein the dashboard GUI is configured to receive a selection of a physical cluster in the at least one logical cluster and update the dashboard GUI to display statuses of one or more servers forming the selected physical cluster; and
   in response to the computing system receiving an indication for a failover operation associated with the at least one logical cluster, updating, by the computing system, the dashboard GUI to display one or more action notifications which include at least one user-interactive icon for in-progress or completed failover operations.

2. The computer implemented method of claim 1, further comprising:
   querying, by the computing system, the database to retrieve updated statuses of the set of physical clusters; and
   updating, by the computing system, the dashboard GUI to display the updated statuses of the set of physical clusters.

3. The computer implemented method of claim 1, further comprising:
   receiving, by the computing system, a selection of a server within the one or more servers; and
   updating, by the computing system, the dashboard GUI to display statuses of one or more components forming the selected server.

4. The computer implemented method of claim 1, wherein the indication of the one or more action notifications displayed on the dashboard GUI includes an action type, an action description, and a date and time of an action request.

5. The computer implemented method of claim 1, further comprising:
   in response to the computing system receiving the indication for the failover operation:
      updating, by the computing system, the dashboard GUI to display an interaction graphical icon.

6. The computer implemented method of claim 1, further comprising:
   updating, by the computing system, the status of the at least one logical cluster in response to determining that the failover operation has been completed.

7. The computer implemented method of claim 1, wherein the one or more indicators representing the statuses of each physical cluster within each logical cluster are selectable graphical objects.

8. A non-transitory computer-readable medium storing instructions that, when executed by a computing system, cause the computing system to perform a process comprising:
   generating, by a computing system, a dashboard graphical user interface (GUI) with a status of at least one logical cluster formed by a set of physical clusters of at least one of a plurality of servers;
   querying, by the computing system, a database to retrieve at least one relational table associated with the set of physical clusters and the statuses of each of the set of physical clusters;
   determining, by the computing system, the status of the at least one logical cluster based upon the at least one relational table and the statuses of each of the set of physical clusters;
   causing display, by the computing system, of a dashboard GUI containing the status of the at least one logical cluster and a cluster hierarchy formed by one or more indicators simultaneously representing the statuses of each of the set of physical clusters within the at least one logical cluster,
      wherein the dashboard GUI is configured to receive a selection of a physical cluster in the at least one logical cluster and update the dashboard GUI to display statuses of one or more servers forming the selected physical cluster; and
   in response to the computing system receiving an indication for a failover operation associated with the at least one logical cluster, updating, by the computing system, the dashboard GUI to display one or more action notifications which include at least one user-interactive icon for in-progress or completed failover operations.

9. The non-transitory computer-readable medium of claim 8, wherein the process further comprises:
   querying, by the computing system, the database to retrieve updated statuses of the set of physical clusters; and
   updating, by the computing system, the dashboard GUI to display the updated statuses of the set of physical clusters.

10. The non-transitory computer-readable medium of claim 8, wherein the process further comprises:
    receiving, by the computing system, a selection of a server within the one or more servers; and
    updating, by the computing system, the dashboard GUI to display statuses of one or more components forming the selected server.

11. The non-transitory computer-readable medium of claim 8, wherein the indication of the one or more action notifications displayed on the dashboard GUI includes an action type, an action description, and a date and time of an action request.

12. The non-transitory computer-readable medium of claim 8, wherein the process further comprises:
  in response to the computing system receiving the indication for the failover operation:
    updating, by the computing system, the dashboard GUI to display an interaction graphical icon.

13. The non-transitory computer-readable medium of claim 8, wherein the process further comprises:
  updating, by the computing system, the status of the at least one logical cluster in response to determining that the failover operation has been completed.

14. The non-transitory computer-readable medium of claim 8, wherein the one or more indicators representing the statuses of each physical cluster within each logical cluster are selectable graphical objects.

15. A computing system comprising:
  one or more processors; and
  one or more memories storing instructions that, when executed by the one or more processors, cause the computing system to perform a process comprising:
    generating, by a computing system, a dashboard graphical user interface (GUI) with a status of at least one logical cluster formed by a set of physical clusters of at least one of a plurality of servers;
    querying, by the computing system, a database to retrieve at least one relational table associated with the set of physical clusters and the statuses of each of the set of physical clusters;
    determining, by the computing system, the status of the at least one logical cluster based upon the at least one relational table and the statuses of each of the set of physical clusters;
    causing display, by the computing system, of a dashboard GUI containing the status of the at least one logical cluster and a cluster hierarchy formed by one or more indicators simultaneously representing the statuses of each of the set of physical clusters within the at least one logical cluster,
      wherein the dashboard GUI is configured to receive a selection of a physical cluster in the at least one logical cluster and update the dashboard GUI to display statuses of one or more servers forming the selected physical cluster; and
    in response to the computing system receiving an indication for a failover operation associated with the at least one logical cluster, updating, by the computing system, the dashboard GUI to display one or more action notifications which include at least one user-interactive icon for in-progress or completed failover operations.

16. The computing system according to claim 15, wherein the process further comprises:
  querying, by the computing system, the database to retrieve updated statuses of the set of physical clusters; and
  updating, by the computing system, the dashboard GUI to display the updated statuses of the set of physical clusters.

17. The computing system according to claim 15, wherein the process further comprises:
  receiving, by the computing system, a selection of a server within the one or more servers; and
  updating, by the computing system, the dashboard GUI to display statuses of one or more components forming the selected server.

18. The computing system according to claim 15, wherein the indication of the one or more action notifications displayed on the dashboard GUI includes an action type, an action description, and a date and time of an action request.

19. The computing system according to claim 15, wherein the process further comprises:
  in response to the computing system receiving the indication for the failover operation:
    updating, by the computing system, the dashboard GUI to display an interaction graphical icon.

20. The computing system according to claim 15, wherein the process further comprises:
  updating, by the computing system, the status of the at least one logical cluster in response to determining that the failover operation has been completed.

* * * * *